United States Patent
Yim

[11] Patent Number: 6,041,079
[45] Date of Patent: Mar. 21, 2000

[54] FIELD/FRAME CONVERSION OF DCT DOMAIN MIXED FIELD/FRAME MODE MACROBLOCKS USING 1-DIMENSIONAL DCT/IDCT

[75] Inventor: Changhoon Yim, Edison, N.J.

[73] Assignee: Thomson Consumer Electronics, Inc., Indianapolis, Ind.

[21] Appl. No.: 09/108,005

[22] Filed: Jun. 30, 1998

[51] Int. Cl.[7] .................................................. H04N 7/30
[52] U.S. Cl. .................................. 375/240; 348/403
[58] Field of Search ..................................... 348/384, 390, 348/400, 403, 404; 382/248, 250; 375/240

[56] References Cited

U.S. PATENT DOCUMENTS

| | | | |
|---|---|---|---|
| 5,424,778 | 6/1995 | Sugiyama | 348/403 |
| 5,432,555 | 7/1995 | Park | 348/404 |
| 5,978,514 | 11/1999 | Yamaguchi | 382/243 |

*Primary Examiner*—Bryan Tung
*Attorney, Agent, or Firm*—Joseph S. Tripoli; Eric P. Herrmann; Ronald H. Kurdyla

[57] ABSTRACT

A field/frame conversion method for compressed digital video, especially MPEG type video, having mixed field/frame mode macroblocks in the DCT domain utilizes a 1-D IDCT/DCT approach rather than the conventional 2-D IDCT/DCT approach. A vertical 1-D IDCT is performed on the DCT domain mixed field/frame mode macroblock to obtain a horizontal 1-D DCT domain macroblock. Thereafter, field/frame conversion is performed on the horizontal 1-D DCT domain macroblock to yield a field or frame mode horizontal 1-D DCT domain macroblock, depending on the required conversion. Finally, a vertical 1-D DCT is performed on the field/frame converted horizontal 1-D DCT domain macroblock to yield a 2-D DCT domain macroblock.

2 Claims, 2 Drawing Sheets

FIELD/FRAME CONVERSION OF DCT DOMAIN MIXED FIELD/FRAME MODE MACROBLOCKS USING 1-DIMENSIONAL DCT/IDCT

GOVERNMENT LICENSE RIGHTS IN FEDERALLY SPONSORED RESEARCH AND DEVELOPMENT

The U.S. Government has a paid-up license in this invention and the right in limited circumstances to require the patent owner to license others on reasonable terms as provided for by the terms of contract No. 70NANB5H1174 awarded by the National Institute of Standards and Technology.

INCORPORATION BY REFERENCE

The NIST HDTV Studio System Requirements Document, rev. 3.0, of Mar. 8, 1996, in its entirety, is hereby specifically incorporated herein by reference. The MPEG-2 (Motion Pictures Experts Group) specification standards of MPEG-2 Video (ISO 13818-2) and MPEG-2 Audio (ISO 13818-1) is hereby specifically incorporated herein by reference.

BACKGROUND OF THE INVENTION a. Field of the Invention

The present invention relates to the processing of compressed digital data such as MPEG video and, more particularly, to field/frame format conversion of compressed digital data.

b. Description of the Prior Art

Many digital image and video compression standards such as JPEG, MPEG-1, MPEG-2, H.261, and H.263, are based, at least in part, on Discrete Cosine Transform (DCT) coding techniques. DCT coding techniques are one part of MPEG, for instance, that facilitate the efficient compression and thus coding of video digital data. After the video is digitally encoded (compressed) by an MPEG-2 encoder, for instance, it may be desirable or necessary to manipulate or process, generally known as compositing, the data to perform various functions on the resulting, uncompressed video. Such processing may include wipes and dissolves wherein video from a second source is mixed with the video from a first source.

It has been recognized that video compositing in the compressed domain can save computations over compositing in the uncompressed domain by processing less data and reducing the conversion process between compressed and uncompressed data. With the MPEG-2 video compression standard, such processing in the compressed domain equals processing in the DCT domain. Further, MPEG-2 has what is known as mixed field/frame mode macroblocks. Mixed field/frame mode macroblocks improve coding (compression) efficiency. However, at the same time, such mixed field/frame mode macroblocks creates additional computations when it is desired to perform picture compositing. But, in order to perform DCT domain processing with mixed field/frame mode macroblocks, such field/frame conversion is essential.

The conventional prior art approach to field/frame conversion of DCT domain mixed field/frame mode macroblocks performs such field/frame conversion in the spatial domain. This approach requires 2-D (two-Dimensional) IDCT (Inverse DCT) and 2-D DCT processing. Such 2-D IDCT/DCT processing requires a fair amount of time and coding.

It should be understood that field/frame conversion includes field-to-frame and frame-to-field conversion.

It is thus an object of the present invention to provide a simpler approach to field/frame conversion on DCT domain mixed field/frame macroblocks for video compositing.

It is another object of the present invention to provide a non-spatial domain conversion process on DCT domain mixed field/frame macroblocks for video compositing.

It is yet another object of the present invention to provide a 1-D DCT/IDCT field/frame conversion method on DCT domain mixed field/frame macroblocks for video compositing.

It is still another object of the present invention to provide an apparatus for performing the above objects.

SUMMARY OF THE INVENTION

In one form thereof, the present invention is a method of performing field-to-frame or frame-to-field (field/frame) conversion of DCT domain mixed field/frame mode macroblocks using 1-D DCT/IDCT.

In one form thereof, the method is characterized by performing a vertical 1-D IDCT on the DCT domain mixed field/frame mode macroblock according to a first relationship $Y=S^{-1}X=S^t X$ to obtain a horizontal 1-D DCT domain macroblock. For the case of field-to-frame conversion, Y is replaced with $Y_{field}$ and X is replaced with $X_{field}$ in the first relationship such that the horizontal 1-D DCT domain macroblock is a field mode horizontal 1-D DCT domain macroblock. For the case of frame-to-field conversion, Y is replaced with $Y_{frame}$ and X is replaced with $X_{frame}$ in the first relationship such that the horizontal 1-D DCT domain macroblock is a frame mode horizontal 1-D DCT domain macroblock.

Next, field/frame conversion is performed on the horizontal 1-D DCT domain macroblock utilizing a second relationship $Y_{frame}(2\ m,n)=Y_{field}(m,n)$, with $0 \leq m \leq 7$, and a third relationship $Y_{frame}(2\ m+1,n)=Y_{field}(m+8,n)$, with $0 \leq m \leq 7$. For the case of field-to-frame conversion, the horizontal 1-D DCT domain macroblock is a field mode horizontal 1-D DCT which becomes a frame mode horizontal 1-D DCT domain macroblock. For the case of frame-to-field conversion, the horizontal 1-D DCT domain macroblock is a frame mode horizontal 1-D DCT domain macroblock which becomes a field mode horizontal 1-D DCT domain macroblock.

Finally, a vertical 1-D DCT is performed on the field/frame converted horizontal 1-D DCT domain macroblock according to a fourth relationship X=SY to obtain a 2-D DCT domain macroblock. For the case of field-to-frame conversion, X is replaced with $X_{frame}$ and Y is replaced with $Y_{frame}$ in the fourth relationship such that the 2-D DCT domain macroblock is a frame mode 2-D DCT domain macroblock. For the case of frame-to-field conversion, X is replaced with $X_{field}$ and Y is replaced with $Y_{field}$ in the fourth relationship such that the 2-D DCT domain macroblock is a field mode 2-D DCT domain macroblock.

BRIEF DESCRIPTION OF THE DRAWINGS

So that the manner in which the above recited features, advantages and objects of the present invention are attained and can be understood in detail, a more particular description of the invention briefly summarized above, may be had with reference to the embodiment which is illustrated in the appended drawings, wherein.

It is to be noted, however, that the appended drawings illustrate only a typical embodiment of the invention and are therefore not to be considered limiting of its scope, for the invention may admit to other equally effective embodiments.

DETAILED DESCRIPTION OF THE INVENTION

Figure 1:
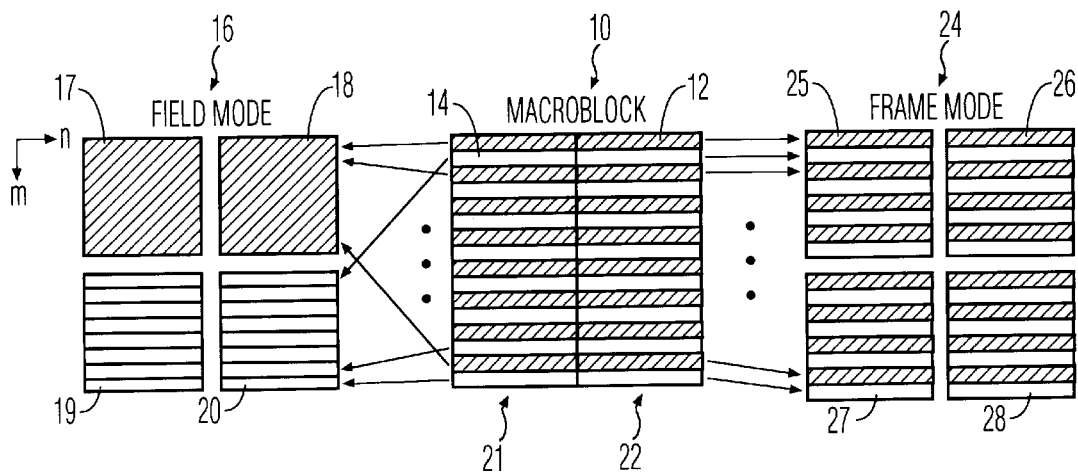
FIG. 1 represents field/frame mode in the spatial domain, depicting a 16×16 macroblock having four (4) corresponding field mode 8×8 DCT blocks and four (4) corresponding frame mode 8×8 DCT blocks.

With reference to FIG. 1, there is represented what is known in MPEG as a 16×16 mixed field/frame mode macroblock generally designated 10. The mixed field/frame mode macroblock 10 is considered by MPEG-2 as divided into alternating eight rows of top field pels 12, shown as solid bars, and eight rows of bottom row field pels 14, shown as non-solid bars. With a mixed field/frame mode macroblock, the macroblock is considered as divided into a field mode portion, generally designated 16, and a frame mode portion, generally designated 24.

The field mode portion 16 is composed of four 8×8 field mode blocks 17, 18, 19, 20, derived from the mixed field/frame mode macroblock 10 in the following manner. The 8×8 field mode block 17 consists of the top field pels from the left side 21 of the macroblock 10. The 8×8 field mode block 18 consists of the top field pels from the right side 22 of the macroblock 10. The 8×8 field mode block 19 consists of the bottom field pels from the left side 21 of the macroblock 10. The 8×8 field mode block 20 consists of the bottom field pels from the right side 22 of the macroblock 10.

The frame mode portion 24 is composed of four 8×8 frame mode blocks 25, 26, 27, 28, derived from the mixed field/frame mode macroblock 10 in the following manner. The 8×8 frame mode block 25 consists of the top and bottom pels of the upper portion of the left side 21 of the macroblock 10. The 8×8 frame mode block 26 consists of the top and bottom pels of the upper portion of the right side 22 of the macroblock 10. The 8×8 frame mode block 27 consists of the top and bottom pels of the lower portion of the left side 21 of the macroblock 10. The 8×8 frame mode block 28 consists of the top and bottom pels of the lower portion of the right side 22 of the macroblock 10.

Let $x(m,n)(0 \leq m, n \leq 15)$ represent the pixel values of one macroblock in the spatial domain. The m index represents the row index, while the n index represents the column index. To distinguish the field mode from the frame mode, let $x_{field}(m,n)$ and $x_{frame}(m,n)$ represent the pixel value in the field mode and the frame mode, respectively. Now, field-to-frame conversion can be defined in the spatial domain by equations (1) and (2).

$$x_{frame}(2m, n) = x_{field}(m, n), \ 0 \leq m \leq 7 \quad (1)$$

$$x_{frame}(2m+1, n) = x_{field}(m+8, n), \ 0 \leq m \leq 7 \quad (2)$$

In equation (1), even lines are obtained from the top field lines, and in equation (2), odd lines are obtained from bottom field lines.

Similarly, frame-to-field conversion can be defined in the spatial domain by equations (3) and (4).

$$x_{field}(m, n) = x_{frame}(2m, n), \ 0 \leq m \leq 7 \quad (3)$$

$$x_{field}(m+8, n) = x_{frame}(2m+1, n), \ 0 \leq m \leq 7 \quad (4)$$

In equation (3), top field lines are obtained from even lines, and in equation (4), bottom field lines are obtained from odd lines.

It should be noted that only the row index m is related in these field-to-frame and frame-to-field conversions in the spatial domain. The column index n is not related.

The 2-D DCT for 8×8 blocks are defined as:

$$X(k, l) = c(k)c(l) \sum_{m=0}^{7} \sum_{n=0}^{7} x(m, n) \cos\left(\frac{\pi(2m+1)k}{16}\right) \cos\left(\frac{\pi(2n+1)l}{16}\right) \quad (5)$$

where $$c(k) = \begin{cases} \frac{1}{\sqrt{2}}, & k = 0 \\ 1, & k > 0 \end{cases}$$

In equation (5), x(m, n) represents the pixel value in the spatial domain, X(k,l) represents the transform coefficient in the 2-D DCT domain, m and k represent the row index in the vertical direction, and n and l represent the column index in the horizontal direction.

Now the 2-D DCT equation (5) can be represented in matrix form as:

$$X = SxS^t \quad (6)$$

where x is the spatial domain block matrix, X is the 2-D DCT domain block matrix, S is the 1-D DCT transform matrix, and $S^t$ is the transpose matrix of S. Since DCT is an orthogonal transform, $S^{-1} = S^t$. Hence the 2-D inverse DCT (IDCT) can be represented as:

$$x = S^t X S \quad (7)$$

Figure 2A:
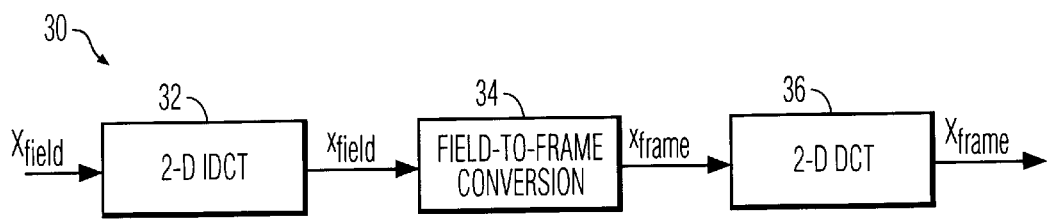
FIG. 2A is a diagrammatic representation of a prior art method for field-to-frame conversion for DCT domain mixed field/frame mode macroblocks using 2-D IDCT and 2-D DCT.
Figure 2B:
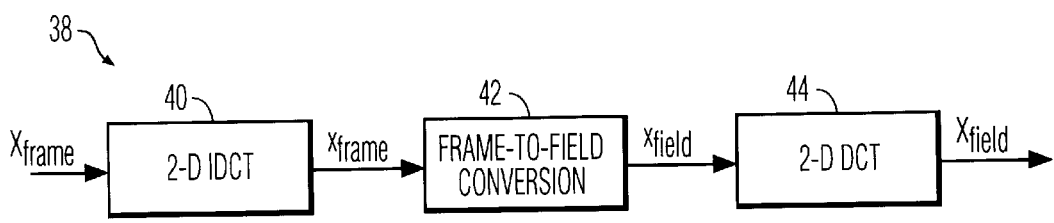
FIG. 2B is a diagrammatic representation of a prior art method for frame-to-field conversion for DCT domain mixed field/frame mode macroblocks using 2-D IDCT and 2-D DCT.

Since the field/frame mode is defined for the macroblocks in the spatial domain, prior art field/frame conversion for 2-D DCT blocks can be performed as in FIGS. 2A and 2B and thus reference is now made to these figures. The following nomenclature is used herein: x is the spatial domain block matrix, X is the 2-D DCT domain block matrix, and Y is the horizontal 1-D DCT domain block matrix. When field and frame subscripts are used, it represents field and frame mode matrices, respectively. Thus, the following nomenclature is used: $x_{field}$ is the field mode spatial domain block matrix, $x_{frame}$ is the frame mode spatial domain block matrix, $X_{field}$ is the field mode 2-D DCT domain block matrix, $X_{frame}$ is the frame mode 2-D DCT domain block matrix, $Y_{field}$ is the field mode horizontal 1-D DCT domain block matrix, and $Y_{frame}$ is the frame mode horizontal 1-D DCT domain block matrix.

In FIG. 2A, a flow diagram, generally designated 30, is depicted illustrating the prior art field-to-frame conversion process in the spatial domain. For box 32, 2-D IDCT is performed in the field mode utilizing equation (7) and replacing x with $x_{field}$ and replacing X with $X_{field}$. The 2-D IDCT operation is performed in the same way for each of the four field mode 2-D DCT blocks $X_{field}$ of the macroblock. As noted above with reference to FIG. 1, there are four field mode blocks (17,18,19,20) in a macroblock. From the 2-D IDCT operation performed on the four field mode blocks as per box 32, four field mode spatial domain blocks $x_{field}$ are obtained. Next, as depicted in box 34, field-to-frame conversion is performed in the spatial domain utilizing equations (1) and (2). The four field mode spatial domain blocks $x_{field}$ become four frame mode spatial domain blocks $x_{frame}$, the four frame mode spatial blocks $x_{frame}$ making up the frame mode spatial domain macroblock. To complete the prior art field-to-frame spatial domain conversion, 2-D DCT, box 36 is performed. 2-D DCT is performed in the frame mode utilizing equation (6) by replacing X with x and replacing $X_{frame}$ with $x_{frame}$. The 2-D DCT is performed in the same way for each of the four spatial domain blocks $x_{frame}$. In this manner, the frame mode 2-D DCT domain macroblock $X_{frame}$ is obtained, i.e. four frame mode 2-D DCT domain blocks.

In FIG. 2B, a flow diagram, generally designated 38, is depicted illustrating the prior art frame-to-field conversion process in the spatial domain. For box 40, the 2-D IDCT is performed in the frame mode utilizing equation (7) and replacing x with $x_{frame}$ and replacing X with $X_{frame}$. The 2-D IDCT operation is performed in the same way for each of the four frame mode 2-D DCT blocks $X_{frame}$ of the macroblock. As noted above with reference to FIG. 1, there are four frame mode blocks (25,26,27,28) in a macroblock. From the 2-D IDCT operation performed on the four frame mode blocks as per box 40, four frame mode spatial domain blocks $x_{frame}$ are obtained. Next, as depicted in box 42, frame-to-field conversion is performed in the spatial domain utilizing equations (3) and (4). The four frame mode spatial domain blocks $x_{frame}$ become four field mode spatial domain blocks $x_{field}$, the four field mode spatial blocks $x_{field}$ making up the field mode spatial domain macroblock. To complete the prior art frame-to-field spatial domain conversion, 2-D DCT, box 44 is performed. 2-D DCT is performed in the field mode utilizing equation (6) by replacing X with x and replacing $X_{field}$ with $x_{field}$. The 2-D DCT is performed in the same way for each of the four spatial domain blocks $x_{field}$. In this manner, the field mode 2-D DCT domain macroblock $X_{field}$ is obtained, i.e. four field mode 2-D DCT domain blocks.

However, since the 2-D DCT is separable, 2-D DCT can be obtained as the cascade of two 1-D DCTs. The following equations (8) and (9) represent the decomposition of equation (5), the 2-D DCT for 8×8 blocks.

$$Y(m, l) = c(l) \sum_{n=0}^{7} x(m, n) \cos\left(\frac{\pi(2n+1)l}{16}\right) \quad (8)$$

$$X(k, l) = c(k) \sum_{m=0}^{7} Y(m, l) \cos\left(\frac{\pi(2m+1)k}{16}\right) \quad (9)$$

Equation (8) represents the horizontal 1-D DCT, while equation (9) represents the vertical 1-D DCT. In matrix form, equations (8) and (9) may be represented as, respectively:

$$Y = xS^t \quad (10)$$
$$X = SY \quad (11)$$

The Y matrix in equation (10) is the horizontal 1-D transformed version of the matrix x. Hence Y is the horizontal 1-D DCT domain block matrix. The 1-D transformed matrix Y can be operated on in the same manner as the spatial domain matrix x for field-to-frame and frame-to-field conversion. The Y matrix can be obtained from the X matrix by the vertical 1-D IDCT:

$$Y = S^{-1}X = S^t X \quad (12)$$

According to an aspect of the present invention, field/frame conversion is performed in the horizontal 1-D DCT domain, utilizing the Y matrix. As such, field-to-frame conversion in the 1-D DCT domain can be performed as per equations (13) and (14) as follows:

$$Y_{frame}(2m, n) = Y_{field}(m, n), \ 0 \leq m \leq 7 \quad (13)$$

$$Y_{frame}(2m+1, n) = Y_{field}(m+8, n), \ 0 \leq m \leq 7 \quad (14)$$

Likewise, according to an aspect of the present invention, frame-to-field conversion is performed in the 1-D DCT domain, utilizing the Y matrix. As such, frame-to-field conversion in the 1-D DCT domain can be performed as per equations (15) and (16) as follows:

$$Y_{field}(m, n) = Y_{frame}(2m, n), \ 0 \leq m \leq 7 \quad (15)$$

$$Y_{field}(m+8, n) = Y_{frame}(2m+1, n), \ 0 \leq m \leq 7 \quad (16)$$

Figure 3A:
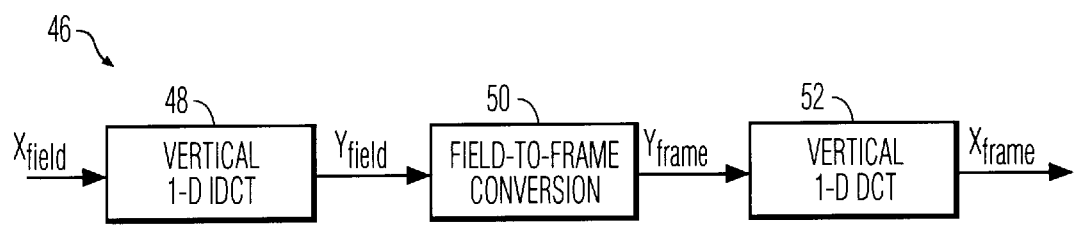
FIG. 3A is a diagrammatic representation of the present method for field-to-frame conversion for DCT domain mixed field/frame mode macroblocks using 1-D IDCT and 1-D DCT.
Figure 3B:
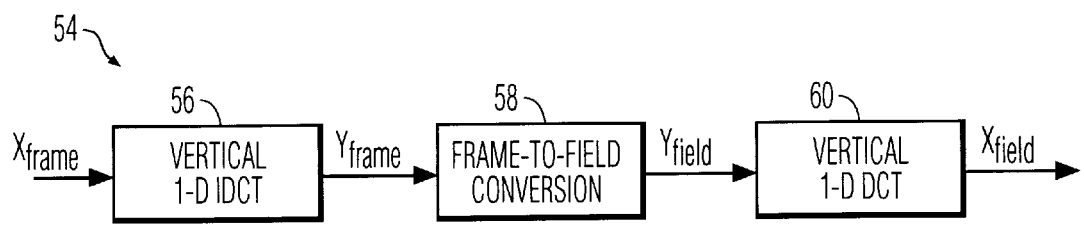
FIG. 3B is a diagrammatic representation of the present method for field-to-frame conversion for DCT domain mixed field/frame mode macroblocks using 1-D IDCT and 1-D DCT.

Reference is now made to FIGS. 3A and 3B. In FIG. 3A, there is depicted a flow diagram, generally designated 46, depicting the logical flow of the present field to frame conversion method. Field-to-frame conversion is performed in the horizontal 1-D DCT domain using field mode horizontal 1-D DCT domain block matrix $Y_{field}$. In box 48, the vertical 1-D IDCT is performed in the field mode by utilizing equation (12) and replacing Y with $Y_{field}$ and X with $X_{field}$. This vertical 1-D IDCT operation is performed in the same way for each of the four field mode 2-D DCT blocks $X_{field}$ in the macroblock. From equation (12) a field mode horizontal 1-D DCT domain macroblock is thus obtained, i.e. four field mode horizontal 1-D DCT domain blocks $Y_{field}$. Next, as in box 50, field-to-frame conversion is performed. Field-to-frame conversion is performed in the horizontal 1-D DCT domain utilizing equations (13) and (14). In this operation, one field mode horizontal 1-D DCT domain macroblock becomes one frame mode horizontal 1-D DCT domain macroblock, i.e. four frame mode horizontal 1-D domain blocks $Y_{frame}$. Next, as in box 52, the vertical 1-D DCT is performed in the frame mode utilizing equation (11). In equation (11), X is replaced with $X_{frame}$ while Y is replaced with $Y_{frame}$. This vertical 1-D DCT operation is performed in the same way for the four horizontal 1-D DCT domain blocks $Y_{frame}$. In this manner the frame mode 2-D DCT domain macroblock is obtained, i.e. four frame mode 2-D DCT domain blocks $X_{frame}$.

In FIG. 3B, there is depicted a flow diagram, generally designated 54, for the logical flow of the present frame-to-field conversion method. Frame-to-field conversion is performed in the horizontal 1-D DCT domain using frame mode horizontal 1-D DCT domain block matrix $Y_{frame}$. In box 56, the vertical 1-D IDCT is performed in the frame mode by utilizing equation (12) and replacing Y with $Y_{frame}$ and X with $X_{frame}$. This vertical 1-D IDCT operation is performed in the same way for each of the four frame mode 2-D DCT blocks $X_{frame}$ in the macroblock. From equation (12) a frame mode horizontal 1-D DCT domain macroblock is thus obtained, i.e. four frame mode horizontal 1-D DCT domain blocks $Y_{frame}$. Next, as in box 58, frame-to-field conversion is performed. Frame-to-field conversion is performed in the horizontal 1-D DCT domain utilizing equations (15) and (16). In this operation, one frame mode horizontal 1-D DCT domain macroblock becomes one field mode horizontal 1-D DCT domain macroblock, i.e. four field mode horizontal 1-D domain blocks $Y_{field}$. Next, as in box 60, the vertical 1-D DCT is performed in the field mode utilizing equation (11). In equation (11), X is replaced with $X_{field}$ and Y is replaced with $Y_{field}$. This vertical 1-D DCT operation is performed in the same way for the four horizontal 1-D DCT domain blocks $Y_{field}$. In this manner, the field mode 2-D DCT domain macroblock is obtained, i.e. four field mode 2-D DCT domain blocks $X_{field}$.

A comparison of the present field/frame conversion method and the prior art field/frame conversion method is warranted. In the present method, field/frame conversion is accomplished utilizing 1-D DCT/IDCT while in the prior art, field/frame conversion is accomplished by utilizing 2-D DCT/IDCT. While many fast algorithms and hardware structures have been developed in this area, for simplicity, a typical fast discrete cosine transform (FDCT) approach is assumed for 1-D DCT and a typical row-column approach is assumed for 2-D DCT. For an eight (8) point DCT, a typical FDCT algorithm by Chen (W. H. Chen, C. H. Smith, and S. C. Fralick, *A Fast Computational Algorithm For The Discrete Cosine Transform*, IEEE Transactions on Communications, COM-25:1004–1009, September 1977) requires sixteen (16) multiplications. (See B. G. Lee, *A New Algorithm To Compute The Discrete Cosine Transform*, IEEE Transactions on Acoustics, Speech, and Signal Processing, ASSP-32(6):1243–1245, December 1984). This corresponds to two multiplications per pixel for 1-D DCT computation. The row-column approach requires the 1-D DCT two times, once in the row direction and once in the column direction. (See A. Madisetti and A. N. Willson, Jr., *A 100 Mhz 2-D 8×8 DCT/IDCT Processors For HDTV Applications*, IEEE Transactions on Circuits and Systems For Video Technology, 5:158–165, 1995). This corresponds to four multiplications per pixel for 2-D DCT computation. Moreover, the row-column approach requires a matrix transposition which makes more complex the hardware structures for 2-D DCT. Similarly, 1-D IDCT requires 2 multiplications per pixel, while 2-D IDCT requires four multiplications per pixel plus matrix transposition.

Therefore, the present field/frame conversion method requires only four multiplications per pixel for 1-D IDCT and 1-D DCT, while the prior art field/frame conversion method requires eight multiplications per pixel plus two matrix transpositions for 2-D IDCT and 2-D DCT.

Masking operations will now be discussed in the context of the present field/frame conversion method. Let x(m, n) be the input picture, w(m, n) be the masking function, and y(m, n) be the masked picture. Then the masking operation in the spatial domain is defined as the following equation:

$$y(m, n)=w(m, n) \cdot x(m, n) \tag{17}$$

Masking operation can be used for picture compositing of two pictures. Picture compositing of two pictures $x_1(m, n)$ and $x_2(m, n)$ by a masking function w(m, n) is defined as:

$$y(m, n)=w(m, n) \cdot x_1(m, n)+(1-w(m, n)) \cdot x_2(m, n) \tag{18}$$

In equation (18), w(m, n) has a value between 0 and 1. If w(m, n) is 1, then $x_1(m, n)$ is selected as the output y(m, n) at coordinate (m, n). Conversely, if w(m, n) is 0, then $x_2(m, n)$ is selected as the output y(m, n) at coordinate (m, n).

Two types of masking operations, namely dissolves and wipes, fall into the category of picture compositing. A dissolve operation is a compositing of two pictures by a linear addition of two pictures. The dissolve operation can be defined in the spatial domain by the following equation:

$$y(m, n)=cx_1(m, n)+(1-c)x_2(m, n) \text{ for all } (m, n) \tag{19}$$

where c is a constant between 0 and 1.

The dissolve can be performed in the DCT domain only when the two macroblocks from two pictures have the same field/frame mode. If the two modes are different, then the field/frame conversion should be performed first so that the two modes are the same. After the field/frame conversion is performed and the field/frame modes for the two macroblocks of the two pictures are the same, the dissolve operation can be performed for the two macroblocks in the 2-D DCT domain.

A wipe operation is also a compositing of two pictures and can be defined by the following equation:

$$y(m, n)=w(m, n) \cdot x_1(m, n)+(1-w(m, n)) \cdot x_2(m, n) \tag{20}$$

where w(m, n) is 0 or 1. If w(m, n) is 1, then $x_1(m, n)$ is selected as the output y(m, n) at coordinate (m, n). If w(m, n) is 0, then $x_2(m, n)$ is selected as the output y(m, n) at coordinate (m, n).

For a wipe operation in the DCT domain, field/frame conversion is required so that the two macroblocks from the two pictures have the same mode. After that, the masking operation can be performed in the DCT domain for the wipe operation as in equation (3).

It should be apparent that many modifications and variations to the present invention may be made by one skilled in the art without departing from the spirit or scope of the novel concepts of the present invention. It is intended that the claims be interpreted as including such modifications and variations.

What is claimed is:

1. A method of performing field/frame conversion of DCT domain mixed field/frame mode macroblocks comprising the steps of:

a) performing a vertical 1-D IDCT on the DCT domain mixed field/frame mode macroblock according to a first relationship $Y=S^{-1}X=S^T X$ to obtain a horizontal 1-D DCT domain macroblock;

b) performing field/frame conversion on said horizontal 1-D DCT domain macroblock utilizing a second relationship $Y_{frame}(2\ m,n)=Y_{field}(m,n)$, with $0 \leq m \leq 7$, and a third relationship $Y_{frame}(2\ m+1,n)=Y_{field}(m+8,n)$, with $0 \leq m \leq 7$; and c) performing a vertical 1-D DCT on the field/frame converted horizontal 1-D DCT domain macroblock according to a fourth relationship $X=SY$ to obtain a 2-D DCT domain macroblock.

2. The method of claim 1, wherein for step a) for a case of field-to-frame conversion Y is replaced with $Y_{field}$ and X is replaced with $X_{field}$ in said first relationship such that said horizontal 1-D DCT domain macroblock is a field mode horizontal 1-D DCT domain macroblock, and for a case of frame-to-field conversion Y is replaced with $Y_{frame}$ and X is replaced with $X_{frame}$ in said first relationship such that said horizontal 1-D DCT domain macroblock is a frame mode horizontal 1-D DCT domain macroblock, for step b) for the case of field-to-frame conversion said horizontal 1-D DCT domain macroblock is a field mode horizontal 1-D DCT which becomes a frame mode horizontal 1-D DCT domain macroblock, and for the case of frame-to-field conversion said horizontal 1-D DCT domain macroblock is a frame mode horizontal 1-D DCT domain macroblock which becomes a field mode horizontal 1-D DCT domain macroblock; and for step c) for the case of field-to-frame conversion X is replaced with $X_{frame}$ and Y is replaced with $Y_{frame}$ in said fourth relationship such that said 2-D DCT domain macroblock is a frame mode 2-D DCT domain macroblock, and for the case of frame-to-field conversion X is replaced with $X_{field}$ and Y is replaced with $Y_{field}$ in said fourth relationship such that said 2-D DCT domain macroblock is a field mode 2-D DCT domain macroblock.

* * * * *